Dec. 13, 1927.
C. KRÄMER
1,652,898
COOLING ARRANGEMENT
Filed June 21, 1923
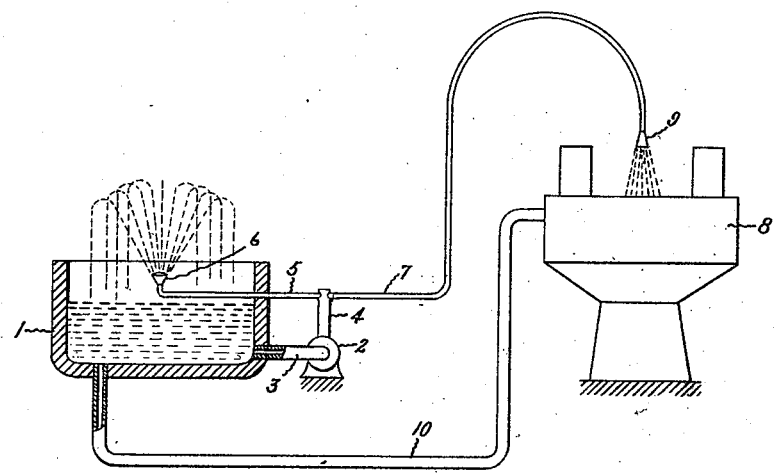
Inventor:
Christian Krämer,
by *Alexander D. Lunt*
His Attorney.

Patented Dec. 13, 1927.

1,652,898

UNITED STATES PATENT OFFICE.

CHRISTIAN KRÄMER, OF PANKOW, GERMANY, ASSIGNOR TO GENERAL ELECTRIC COMPANY, A CORPORATION OF NEW YORK.

COOLING ARRANGEMENT.

Application filed June 21, 1923, Serial No. 646,985, and in Germany August 10, 1922.

My invention relates to cooling systems adapted particularly for electrical devices of large power, such, for example, as mercury arc rectifiers. It is the object of my invention to provide an improved water cooling system suitable for power devices and similar installations, which requires no oversight and has no complicated and expensive control devices.

In accordance with my invention I have provided a simple, efficient cooling outfit of low cost whereby the cooling fluid is circulated in parallel by a single pump between the device to be cooled, for example, a rectifier, and a heat dissipating device such for example, as a spray cooler.

The accompanying drawing illustrates my invention diagrammatically.

This drawing shows a tank 1 from which water is drawn continuously by a pump 2 through a duct 3, and delivered under pressure to a conduit 4, one branch 5 of which terminates in a nozzle 6 from which part of the water drawn from the tank 1 is returned as a fine spray or fountain causing an energetic cooling of the water. At the same time another part of the water is delivered by a duct 7 to the mercury arc device 8 which is to be cooled. This duct also may terminate in a nozzle 9 for delivering a spray. The water which has become warmed by contact with the heated device 8 returns by a conduit 10 to the tank 1.

This arrangement has several advantages. By delivering only part of the water from the pressure pipe 4 to the rectifier and returning the rest as a spray, it is possible in a given time to produce an energetic cooling. Furthermore, the circulation of water in the rectifier is entirely independent of the height of the water in the main container and no such control devices are required as would be necessary were the cooling water taken direct from the rectifier and delivered to a container at a higher level. As many rectifiers as may be desired to be cooled can be supplied with cooling water from the pressure pipe 4. In place of the spray nozzle other suitable forms of cooling devices may be used.

What I claim as new and desire to secure by Letters Patent of the United States, is,—

1. A fluid cooling system for an electric discharge device, said system including a tank, a pump connected with the tank, and means for delivering cooling fluid as a spray to said tank and device.

2. In combination, a device adapted to be cooled by a circulating fluid, means comprising a spray applied directly to the device for supplying a portion of the cooling effect to the circulating fluid, and a second spray cooperating with the first spray to effect a further cooling of the circulating fluid to a desired temperature.

3. A cooling system comprising a reservoir adapted to contain water, means for withdrawing water therefrom, means for returning the same in part as a spray, a branch conduit for delivering another part of said water to a device to be cooled, and a return connection, independent of said spray, from said device to said reservoir.

4. In combination with a device to be cooled, a tank adapted to contain water, a conduit for withdrawing water therefrom, a cooling device, a pump, a pressure pipe fed by said pump and having one branch leading to said cooling device and another branch to said device to be cooled and a return pipe from said device to be cooled to said tank.

5. A cooling system comprising a reservoir adapted to contain water, means for withdrawing water therefrom, means for returning the same in part as a spray, and a branch conduit for delivering another part of said water as a spray to a device to be cooled.

In witness whereof, I have hereunto set my hand at Berlin this thirty-first day of May, 1923.

CHRISTIAN KRÄMER.